3,063,899
β-HYDROXYBUTYRIC ACID-CYCLOHEXYLAMIDE
AND A PROCESS OF PREPARING IT
Gustav Ehrhart, Bad Soden, Taunus, Ingeborg Hennig, Kelkheim, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Höchst, Germany, a company of Germany
No Drawing. Filed Feb. 17, 1959, Ser. No. 793,678
Claims priority, application Germany Feb. 22, 1958
4 Claims. (Cl. 167—65)

The present invention relates to β-hydroxybutyric acid cyclohexylamide which is a good analgesic. The subject matter of the present invention likewise comprises a process for preparing this compound by reducing in a manner known per se, acetoacetic acid-cyclohexylamide corresponding to the formula

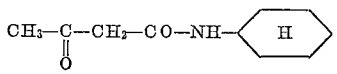

or by converting β-hydroxybutyric acid or its reactive functional derivatives which may be acylated in β-position into the amide of the above-mentioned formula, whereby an acyl radical which may be present in the β-hydroxy group is split off in the usual manner or by treating the β-aminobutyric acid cyclohexylamide with an equivalent amount of nitrous acid, or by reacting β-butyrolactone with cyclohexylamine.

It is of special advantage to apply for the preparation of the new compound the process comprising the reduction of the acetoacetic acid cyclohexylamide. The starting substance can be prepared, for example, by adding diketenes to the mentioned amine in organic solvents or in water.

Acetoacetic acid cyclohexylamide can be reduced in known manner to β-hydroxybutyric acid cyclohexylamide. The keto group can be reduced, for instance, catalytically with the aid of metals of the eighth group of the periodic system, preferably nickel catalysts, in the presence of usual solvents, such as aqueous alcohols, alcohols or water. There can likewise be used precious metals or Raney catalysts. It is, furthermore, possible to carry out the reduction by means of nascent hydrogen, for instance aluminum amalgam and alcohol, sodium amalgam or sodium boronhydride. It can likewise be realized electrolytically.

The reaction of β-hydroxybutyric acids, β-acyloxybutyric acids or their functional derivatives is carried out according to known methods. As acyl groups there enter into consideration preferably low molecular aliphatic acyl radicals, particularly the acetyl radical. As functional derivatives there are suitable above all the low molecular alkyl or the phenol-esters of β-hydroxybutyric acid which can be reacted with cyclohexylamine. This reaction is carried out in usual manner by heating both components for a prolonged period. Another advantageous process starting from functional derivatives of β-hydroxybutyric acid consists in that β-hydroxybutyric acid halides, preferably corresponding acid chlorides or bromides the hydroxyl group of which is favorably substituted by an acyl radical, are reacted with cyclohexyl-amine. For preparing β-hydroxybutyric acid cyclohexylamide this acyl radical is split off in usual manner after the reaction is terminated, for example, by hydrolysis with dilute alkalies or acids. The reaction is suitably carried out in inert solvents, such as ether, benzene, toluene, methylene-chloride or chloroform, in the presence of an agent splitting off hydrogen halide and, generally, it can already be carried out in the cold. It is of special advantage to use as substance splitting off hydrogen halide, a second mol of cyclohexylamine, it being possible to suck off the hydrohalic acid salt of the amine directly or to eliminate the latter by shaking it out with water.

Furthermore, the new compound can be prepared by starting from β-aminobutyric acid-cyclohexylamide obtained according to known methods. To this amide there is added dropwise in the presence of a dilute mineral acid, preferably hydrochloric acid or sulfuric acid, while stirring and, if necessary, cooling, the equimolar amount of a concentrated aqueous solution of an alkali metal nitrite, preferably sodium nitrite. The evolution of nitrogen demonstrating the conversion of the amino group into the hydroxyl group generally begins on heating to room temperature. The reaction mixture is stirred again for some time at room temperature, if necessary at a slightly elevated temperature (for instance steam bath), until the evolution of gas is terminated and, therewith, the conversion of the amino group into the hydroxyl group is realized.

As starting compound β-butyrolactone can likewise be used which can be produced according to known methods, for instance by catalytic hydrogenation of diketene. The desired compound is formed by reaction with cyclohexylamine. This reaction is carried out by reacting both compounds in the absence or presence of solvents, for instance water or organic solvents, such as alcohols, benzene, toluene, ether or acetonitrile. The reaction is suitably carried out with external cooling and it is finished after the mass has been allowed to stand for a prolonged time at room temperature and after subsequent heating. The product of the invention can be isolated from the reaction mixture by means of crystallization.

The new compound corresponding to the formula

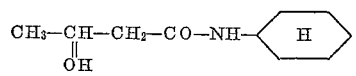

constitutes a valuable medicament which apart from low toxicity is characterized by favorable analgesic properties. It is of special importance particularly for parenteral application, that the product is soluble in water, in the cold even more easily (about 10%) than in the heat. The analgesic efficiency was tested according to the method of Wolff-Hardy and Goodell, by exposing mice to irritation by heat until they showed a defensive action. At first, the normal period of reaction was ascertained. In the control test a group of 60 mice showed defensive action on an average 7.2 seconds upon irritation. The dose necessary for provoking analgesia amounts to 750 milligrams/kilogram of β-hydroxybutyric aicd cyclohexylamide; as an average value in mice treated there was ascertained a prolongation of the reaction period of 28 seconds. The toxicity of the compound is relatively low; it amounts to 600 milligrams/kilogram when intravenously injected.

The preparations can be applied in the form of tablets or dragees, if desired, in combination with other active substances usually used in analgesic combination preparations and with the usual auxiliaries for tableting, for example lactose, starch, magnesium stearate or talc. The preparation can likewise be administered in suspensions or solutions, for instance in oils or polyglycol, in the form of capsules, and it can be injected from ampules, preferably in aqueous solutions.

It was surprising that the β-hydroxybutyric acid cyclohexylamide showed these favorable analgesic properties, since it was known from own tests that numerous primary β-hydroxycarboxylic acid amides comparable with the product of our invention with a view to chemical configuration and shown in the following table could not be used as analgesics.

| No. | Compound | boiling point under (—) mm. of mercury, melting point | analgesic efficiency with subcutaneous application of 1 gram/kilogram | lethal dose administered per os |
|---|---|---|---|---|
| 1 | β-hydroxybutyric acid methylamide | 90° C. (0.1) | practically ineffective | |
| 2 | β-hydroxybutyric acid ethylamide | 92° C. (0.1) | ineffective | |
| 3 | β-hydroxybutyric acid propylamide | 160° C. (4) | do | |
| 4 | β-hydroxybutyric acid n-butylamide | 106° C. (0.25) | practically ineffective | |
| 5 | β-hydroxybutyric acid isobutylamide | 107° C. (0.25) | do | |
| 6 | β-hydroxybutyric acid-secondary-butyl-amide. | 104° C. (0.15) | ineffective | |
| 7 | β-hydroxybutyric acid-n-hexylamide | 129° C. (0.15) | only moderate (1.5 gram/kilogram per os). | 1/gram/kg. |
| 8 | β-hydroxybutyric acid allylamide | 98° C. (0.1) | ineffective | |
| 9 | β-hydroxybutyric acid-2-methyl-cyclohexylamide. | 81° C | ineffective (1.5 gram/kilogram per os). | |
| 10 | β-hydroxybutyric acid-4-methyl-cyclohexylamide. | 105° C | do | |

The compounds designed as "practically ineffective" only exhibit a negligible analgesic action not admitting the practical use of these compounds as medicaments. The compounds mentioned under figures 9 and 10 are so sparingly soluble that they cannot be injected but only administered per os. The same applies to compound 7 which only shows a very moderate analgesic efficiency lasting only for a short time; apart from its heavy solubility this compound cannot be used as analgesic in view of its ratio of active dosis to lethal dose. The solubility of β-hydroxybutyric acid cyclohexylamide in water of room temperature amounts to about 10%; in comparison therewith the solubility of β-hydroxybutyric acid-n-hexylamide amounts to only 2% and that of β-hydroxybutyric acid-2-methyl-cyclohexylamide and of β-hydroxybutyric acid-4-methyl cyclohexylamide to less than 2%.

In comparison with the known hydrocrylic acid-cyclohexyl-amide the new β-hydroxybutyric acid-cyclohexyl-amide is considerably more active as analgesic and less toxic, even when subcutaneously applied. When solutions of 5% strength in propylene-glycol of 50% strength are subcutaneously applied in mice, 500 milligrams/kilogram of hydracrylic acid-cyclohexylamide show less analgesic action than 750 milligrams/kilogram of β-hydroxybutyric acid-cyclohexylamide which show a strong analgesic action. With intravaneous application in the form of solutions of 25% strength in pure propyleneglycol 500 milligrams/kilogram of hydracrylic acid-cyclohexylamide were likewise analgesically less efficient than 500 milligrams/kilogram of β-hydroxybutyric acid-cyclohexylamide. On subcutaneous injection of 750 milligrams/kilogram of hydracrylic acid-cyclohexylamide 40% of the mice treated died, whereas 750 milligrams/kilogram of β-hydroxybutyric acid-cyclohexylamide were tolerated by all the animals; only a dose of 1300 milligrams/kilogram of β-hydroxybutyric acid-cyclohexylamide, subcutaneously injected, killed 40% of the mice. It must be added that hydracrylic acid-cyclohexylamide in contradistinction to β-hydroxybutyric acid-cyclohexylamide is very sparingly soluble in water.

The following examples serve to illustrate the invention but they are not intended to limit it thereto:

Example 1

168 grams of diketene are dropwise added, while stirring, at 30–40° C., to 200 grams of cyclohexylamine in 200 cc. of benzene. After concentration under reduced pressure the residue solidifies.

(a) 360 grams of the crude acetoacetic acid-cyclohexylamide obtained (melting point 76° C. after recrystallization from ethyl-acetate) are hydrogenated in a pressure-vessel at 60° C. in methanol in the presence of Raney nickel or of a nickel catalyst precipitated on kieselguhr. After absorption of the calculated amount of hydrogen the mass is filtered and the filtrate is concentrated under reduced pressure. After recrystallization from ethyl-acetate there are obtained from the crystalline residue about 320 grams of β-hydroxybutyric acid-cyclohexylamide which melts at 85–86° C.

(b) 23 grams of sodium-boronhydride are added in several portions while stirring and cooling to 350 grams of acetoacetic acid-cyclohexylamide dissolved in 700 cc. of methanol and 35 cc. of water. Upon neutralization by means of dilute hydrochloric acid the mass is concentrated under reduced pressure. Sodium chloride is added to the reaction mixture until it is saturated and subsequently it is extracted with ethyl-acetate. The ethyl-acetate solution is dried and the solvent is evaporated. After recrystallization from ethyl-acetate there are obtained from the solid residue 300 grams of β-hydroxybutyric acid-cyclohexylamide which melts at 85–86° C.

Example 2

40 grams of β-hydroxybutyric acid-methyl-ester and 33 grams of cyclohexylamine are heated in a bath of 160° C. for six to eight hours. After concentration under reduced pressure the residue crystallizes. Aftere recrystallization from ethyl-acetate the β-hydroxybutyric acid-cyclohexylamide melts at 85° C.

Example 3

A solution of 22 grams of cyclohexylamine in 50 cc. of ether is added dropwise while stirring at 0° C. to 20 grams of β-butyrolactone and 50 cc. of ether. After standing for 12 hours the light-yellow solution is still thoroughly clear wherefrom it may be deduced that practically no β-cyclohexylamino-butyric acid has been formed as a side-product. The ether is evaporated and the residue solidifies. After recrystallization from ethyl-acetate there are obtained about 25 grams of β-hydroxybutyric acid-cyclohexylamide which melts at 85–86° C.

Example 4

27 grams of cyclohexylamine in 100 cc. of ether are added, while cooling and stirring, to 22 grams of β-acetoxybutyric acid chloride in 100 cc. of ether. After the cyclohexylamine-hydrochloride has been sucked off the filtrate is shaken once with water. After boiling and distilling off the ether the residue solidifies. The β-acetoxybutyric acid-cyclohexylamide thus obtained is heated with 100 cc. of 2 N-sodium hydroxide solution and 75 cc. of alcohol for 30 minutes on the steam bath. Upon neutralization with 2 N-hydrochloric acid the mass is concentrated and extracted with ethyl-acetate. There are obtained about 20 grams of β-hydroxybutyric acid-cyclohexylamide melting at 85° C. (after recrystallization from ethyl-acetate).

Example 5

9.2 grams of β-aminobutyric acid-cyclohexylamide are dissolved in 60 cc. of 2 N-hydrochloric acid. With cooling on ice 3.8 grams of sodium nitrite dissolved in a little water, are added. After heating to room temperature evolution of gas slowly occurs which after heating for 30 minutes on the steam bath is terminated. Upon concentration of the aqueous solution it is shaken out with chloroform. The chloroform residue crystallizes after trituration with glacial acetic acid. After recrystallization from ethyl-acetate the β-hydroxybutyric acid-cyclohexylamide is obtained which melts at 84° C.

We claim:

1. A therapeutic composition having analgesic activity, comprising in dosage unit form, from about 100 to about 500 milligrams of β-hydroxybutyric acid cyclohexylamide and a pharmaceutical carrier.

2. An analgesic composition in accordance with claim 1, where the dosage unit is in a form selected from the group consisting of tablets, dragees and gelatin capsules and where the pharmaceutical carrier is a solid carrier.

3. An analgesic composition in accordance with claim 1, where the dosage unit is in soft gelatin capsule and the pharmaceutical carrier is selected from oils and polyglycols.

4. An analgesic composition in accordance with claim 1 for parenteral use, where the dosage unit is in ampules and the pharmaceutical carrier is a steril diluent for parental application.

References Cited in the file of this patent

UNITED STATES PATENTS

| 2,820,801 | De Benneville | Jan. 21, 1958 |
| 2,830,087 | Ehrhart | Apr. 8, 1958 |
| 2,851,494 | Ehrhart | Sept. 9, 1958 |
| 2,876,262 | Ehrhart | Mar. 3, 1959 |

OTHER REFERENCES

Harris: J. Applied Physiology, July 1954, pp. 84–88.

Batterman: J.A.M.A., vol. 155, No. 11, July 10, 1954, pp. 965–968.

Beecher: J.A.M.A., vol. 158, No. 5, June 4, 1955, pp. 399–401.

Pulse of Pharmacy, vol. 12, No. 2, 1958, pp. 7–9 (esp. p. 8).